(12) United States Patent
Seevers et al.

(10) Patent No.: US 10,926,500 B2
(45) Date of Patent: Feb. 23, 2021

(54) METHOD AND DEVICE FOR HANDLING TIRES

(71) Applicant: HARBURG-FREUDENBERGER MASCHINENBAU GMBH, Hamburg (DE)

(72) Inventors: Jörn Seevers, Lüneburg (DE); Rüdiger Meincke, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 11 days.

(21) Appl. No.: 16/305,950

(22) PCT Filed: May 18, 2017

(86) PCT No.: PCT/DE2017/000143
§ 371 (c)(1),
(2) Date: Nov. 30, 2018

(87) PCT Pub. No.: WO2017/215688
PCT Pub. Date: Dec. 21, 2017

(65) Prior Publication Data
US 2019/0126578 A1    May 2, 2019

(30) Foreign Application Priority Data
Jun. 14, 2016  (DE) .................. 10 2016 007 315.2

(51) Int. Cl.
*B29D 30/06* (2006.01)
*B23Q 7/04* (2006.01)

(52) U.S. Cl.
CPC ......... *B29D 30/0662* (2013.01); *B23Q 7/041* (2013.01); *B29D 30/0603* (2013.01)

(58) Field of Classification Search
CPC ...... B23Q 7/045; B29D 30/0603; B60B 29/00
(Continued)

(56) References Cited

U.S. PATENT DOCUMENTS 4,578,023 A    3/1986   Irie
4,681,521 A    7/1987   Grotkasten
(Continued)

FOREIGN PATENT DOCUMENTS

DE    3443947 A1    6/1986
DE    3918209 A1    12/1990
(Continued)

*Primary Examiner* — Saul Rodriguez
*Assistant Examiner* — Willie Berry, Jr.
(74) *Attorney, Agent, or Firm* — Lucas & Mercanti, LLP; Klaus P. Stoffel

(57) ABSTRACT

A handling device for tires having at least one extension arm, wherein the at least one extension arm is secured with a first extension arm pivot location to a receiving member in such a manner that a pivoting of the at least one extension arm relative to the receiving member is supported and the at least one extension arm has a second extension arm pivot location so that at least one gripping tool is coupled to the at least one extension arm. At least a second gripping tool is coupled to the second extension arm pivot location, and the at least two gripping tools can be pivoted relative to at least one extension arm pivot location. The invention further relates to a method for carrying out a loading and unloading cycle with tires of a tire vulcanization machine.

10 Claims, 3 Drawing Sheets

(58) Field of Classification Search
USPC .......................................................... 414/426
See application file for complete search history.

(56) References Cited

U.S. PATENT DOCUMENTS

| | | |
|---|---|---|
| 5,017,111 A | 5/1991 | Drewel |
| 10,252,426 B2 * | 4/2019 | Starz .................... B25J 15/0052 |
| 2009/0035107 A1 * | 2/2009 | Duran ........................ B25J 5/02 |
| | | 414/426 |
| 2015/0328851 A1 | 11/2015 | Cheng |

FOREIGN PATENT DOCUMENTS

| | | |
|---|---|---|
| EP | 0099507 A2 | 2/1984 |
| JP | S4937982 A | 4/1974 |
| JP | 2002273733 A | 9/2002 |
| JP | 2008284838 A | 11/2008 |

\* cited by examiner

METHOD AND DEVICE FOR HANDLING TIRES

CROSS-REFERENCE TO RELATED APPLICATIONS

The present application is a 371 of International application PCT/DE2017/000143, filed May 18, 2017, which claims priority of DE 10 2016 007 315.2, filed Jun. 14, 2016, the priority of these applications is hereby claimed and these applications are incorporated herein by reference.

BACKGROUND OF THE INVENTION

The invention relates to a handling device for tires, having at least one extension arm, wherein the at least one extension arm is secured with a first extension arm pivot location to a receiving member in such a manner that a pivoting of the at least one extension arm relative to the receiving member is supported and the at least one extension arm has a second extension arm pivot location so that at least one gripping tool is coupled to the at least one extension arm.

The invention further relates to a method for carrying out a loading and unloading cycle with tires of a tire vulcanization machine.

The production of a tire, for example, for vehicles such as cars or motorcycles, is an extremely complex process which involves a large number of production and process steps. The reason for this is the complex tire construction which comprises a considerable number of different individual components. In addition, this large number of components have to be connected to each other under the action of pressure and temperature, the so-called vulcanization. The vulcanization process is also significant with regard to the material and adhesion properties of the completed tire.

Not only the completed tire as an end product of the tire production process, but also the tire blank is already a highly complex component comprising many semi-finished product elements. As a result of the multi-layer construction, the individual components first have to be joined together before a vulcanization operation, that is to say, the tire components are separated according to correct size and supplied in a precise manner in terms of location, position and orientation to a carcass drum which is located inside a tire construction machine. In this manner, the tire blank is produced and prepared for the vulcanization.

Many of the tire components are present as web-like and/or curved semi-finished products: different rubber mixtures and caoutchouc-based composite materials, woven textiles or textile cord, woven steel belts and bead cores surrounded with caoutchouc. In order to supply these web-like and/or curved semi-finished products to the carcass drum, position servers are sometimes used within a tire construction machine.

As a result of the considerable number of production steps, production facilities are produced in large halls and comprise machines, installations and handling means which are suitable for the individual production steps. These production lines or production centers are supplemented by prestream and downstream equipment for preparing tire components or post-processing or packing the completed tires. In order to be able to produce the material flows in and for tire production installations, transport devices are also provided.

Typically, the tire blanks are produced by tire construction machines and initially stored in a store. From this store, which practically acts as a type of first buffer store for the subsequent production process, the tire blanks are then continuously or discontinuously removed as required and transported to the tire hot presses in order to be vulcanized at that location.

In production halls with a large production capacity, the tire hot presses are often located in rows beside each other and the rows of machines are separated by accessible paths. A supply of the tire blanks is carried out in the context of a piece of transport equipment often using rails which are installed in an upper hall region. Along the rails, transport and retention devices can be moved in a controlled manner. According to a variant of a known production sequence, the rails extend above the hot presses and the tire blanks are lowered into the region of the tire hot press by means of retention devices which are mounted on chains.

These transport devices for tire blanks, which often operate automatically and which are moved under the hall ceiling on rails, transport the tire blanks from a buffer station to the tire vulcanization machines. In this instance, the transport carriages move on rails as far as the respective heating location and load the blank stand of the tire vulcanization machine. The blank stand is located at the hall floor level and consequently generally at the height of the tire vulcanization machines. For safety reasons, a large safety scanner field is required since a tire is automatically lowered rapidly from above to floor level with a gripping device. This safety scanner field requires a large hall surface-area and makes access to the respective tire vulcanization machine more difficult. Each malfunction has to be acknowledged manually and interrupts the supply of additional tire vulcanization machines.

According to another embodiment of the handling devices, corresponding transport rails extend as a travel basis for the loading systems and supply devices above the travel paths adjacent to the tire vulcanization machines and production stations in accordance with the steps for tire production. The tire blanks which are intended to be vulcanized are positioned by handling devices which are provided with pivot arms and/or arms which can be positioned differently, in particular longitudinal extension arms. As a result of the longitudinal extension arms which are significantly shorter than transport devices provided in the region of the hall ceiling, transport devices above the travel paths are considerably steeper and consequently the handling system which can be controlled in a more precise manner, by means of which a very high level of precision can be achieved.

A frequently required post-processing operation after the vulcanization can be carried out by means of selective cooling of the completed tire which still has residual heat and optionally with an application of internal pressure. Since the completed tire which has residual heat is structurally unstable and very sensitive, particularly high requirements are placed on the handling devices for the tire removal from the handling space of the tire vulcanization machine and the transport or the introduction into the post-processing device. Therefore, handling devices are provided with suitable gripping tools which can also grip and receive the sensitive tires. Gripping tools of this construction are complex and costly.

Handling devices, which, as a result of their function within the tire production process and with respect to the handling space of the tire vulcanization machine, are also referred to as loaders or unloaders, have to move the tire or tire blank which is intended to be handled over paths in all spatial directions and where applicable change the tire orientation.

Furthermore, movements and orientation changes have to be carried out as quickly as possible in order to keep the required handling and transport times low and to minimize the overall process time of the tire production.

Positioning precisions with a small position and/or orientation deviation may also be included in the range of requirements of handling devices. These may, for example, be required during the loading operation or placement of the tire blank in the tire mould, in the container or the handling space. Positioning precision is also required when the completed tires which have residual heat are placed for the purposes of post-processing in the Post Cure Inflator or the Post Cure Device, for example, in order to place the completed tire with the tire bead thereof in a precise position on the tire plate.

Handling devices are often formed by means of an overhang which is secured to a base. The overhang is connected at one end to the base by means of an articulation and generally has a gripping tool at the other end thereof. The articulated fixing of the overhang to the base supports a pivoting relative to the base.

The disadvantage of these constructions is that the paths of the gripping tools which can be produced are defined, determined and considerably limited by the length of the overhang.

Another problem with generic handling devices is the limited movement kinematics. If degrees of movement freedom of the overhang or the extension arms which carry/carries the gripping tool are produced by means of an articulation, the extension arm can be pivoted only about this rotation location. Consequently, it is only possible for the gripping tools to move over a circle.

As a result of the paths present and the movement pattern of the handling devices or the gripping tools, which pattern is limited to circles, devices of this type have to be placed spatially adjacent to the tire vulcanization machine in order to be able to reach the handling space with the gripping tools and to be able to introduce the tire blanks or remove the completed tires. Generally, the handling range cannot therefore be extended to a second or a plurality of tire vulcanization machines.

A further disadvantageous property of known handling devices is that for the handling task of loading and the handling task of unloading, in many cases a separate handling device has to be provided. Often it is responsible for the gripping tools for the loading and unloading being constructed differently. The paths which are generally intended to be produced in this context are also in many cases responsible therefor. As a consequence of the separate handling devices for loading and unloading, handling spaces which are generally arranged in two spatial directions have to be provided in the tire vulcanization machine for the at least two handling devices. This results in a larger overall spatial requirement and makes it necessary for the respective handling spaces to have to be secured with regard to endangering persons and safety at work.

SUMMARY OF THE INVENTION

An object of the invention is to provide a handling device for tires which at least partially reduces the disadvantages mentioned and which supports a cost-effective overall construction.

As a solution, the teaching according to the invention proposes a handling device which has at least a first and a second gripping tool and which is structurally configured in such a manner that both loading and unloading handling tasks can be carried out by the one handling device.

The invention recognizes that the integration of at least two gripping tools in a handling device affords the possibility of carrying out both the loading function and the unloading function in and with one handling device. In this manner, the disadvantages mentioned of previously used handling devices can be at least partially reduced.

As a result of the combination of the loader and unloader in one handling device, it is further particularly advantageous that only one handling space is required for both handling tasks. As a result, not only is the handling space which is intended to be secured reduced, but also the production space which is required in total and/or, for example, the production surface which is intended to be provided inside a machine hall.

If the handling device according to the invention is integrated in a piece of transport and supply equipment which is preferably provided at the hall ceiling and above the production machine level, it is further possible to completely dispense with a handling space which has to be secured in technical terms involving operation and persons since it is then located above and outside the range of operators.

In addition to the actual spatial and/or surface reduction according to the amount, another quite considerable advantage is the integration of both handling functions in one handling space. It is thereby possible to carry out the handling functions from precisely one spatial direction relative to the tire vulcanization machine.

As a result of the handling device according to the invention, a significant speed advantage is further afforded. The speed gain and accordingly a reduction of the overall handling time required can lower the tire production time and consequently increase the production and efficiency of the installation. The functional property of the teaching according to the invention which is the reason for this is the at least partial, almost double use of at least one part-path of the pivot movement for both the loading handling operation and the unloading handling operation. The time savings which can be achieved are approximately 10% in comparison with the use of separate loaders and unloaders.

The structural production of the handling device according to the invention makes provision for at least a first extension arm with a first extension arm pivot location. The first extension arm pivot location forms the coupling location with respect to a receiving member which can act as a base for the handling device and which can optionally be moved, for example, in a state supplemented by a sliding member in a spatial direction. In this manner, there is provided a preferably linear degree of freedom which promotes the possibility of approaching operating locations in different operating planes or spatial height levels.

The linear degree of freedom may alternatively or additionally also be produced in other components of the handling device.

The extension arm further has a second extension arm pivot location which forms the coupling location with respect to the at least two gripping tools. The degree of freedom of the second extension arm pivot location may be of a linear type, but is preferably rotational. If the second extension arm pivot location is provided with a degree of freedom of rotation, it is possible to arrange the rotation axis either a) parallel with or in extension of the extension arm center axis, or b) in any axis which is non-parallel with the extension arm center axis.

It is further possible and there is provision in another construction variant c) for the degree of freedom of movement to be extended to a plurality of spatial and/or rotational directions and in this manner for a multidirectional degree of freedom to be supported.

For example, the degrees of freedom of movement according to the embodiments a) and b) can be brought about by means of a rotary or cardan joint which is arranged in an appropriate manner, the production in the context of a multidirectional degree of freedom is, for example, possible as a result of ball joints.

The arrangement of the at least two gripping tools may be carried out in different manners in accordance with the type of degree of freedom of the second extension arm pivot location which is produced.

On the one hand, with degrees of freedom according to a) and/or b), it is possible to arrange the gripping tools as a sandwich. The space-saving arrangement is advantageous in this instance. On the other hand, the at least two gripping tools may be secured to at least one tool arm, which is coupled to the second extension arm pivot location of the extension arm.

Another embodiment of the handling device according to the invention with four gripping tools is conceivable and is suitable for carrying out loading and unloading handling operations for two adjacent tire vulcanization machines.

BRIEF DESCRIPTION OF THE DRAWING

The construction variant of the at least two gripping tools secured at the end side to a tool arm is illustrated in the Figures, in which.

DETAILED DESCRIPTION OF THE INVENTION

Figure 1:
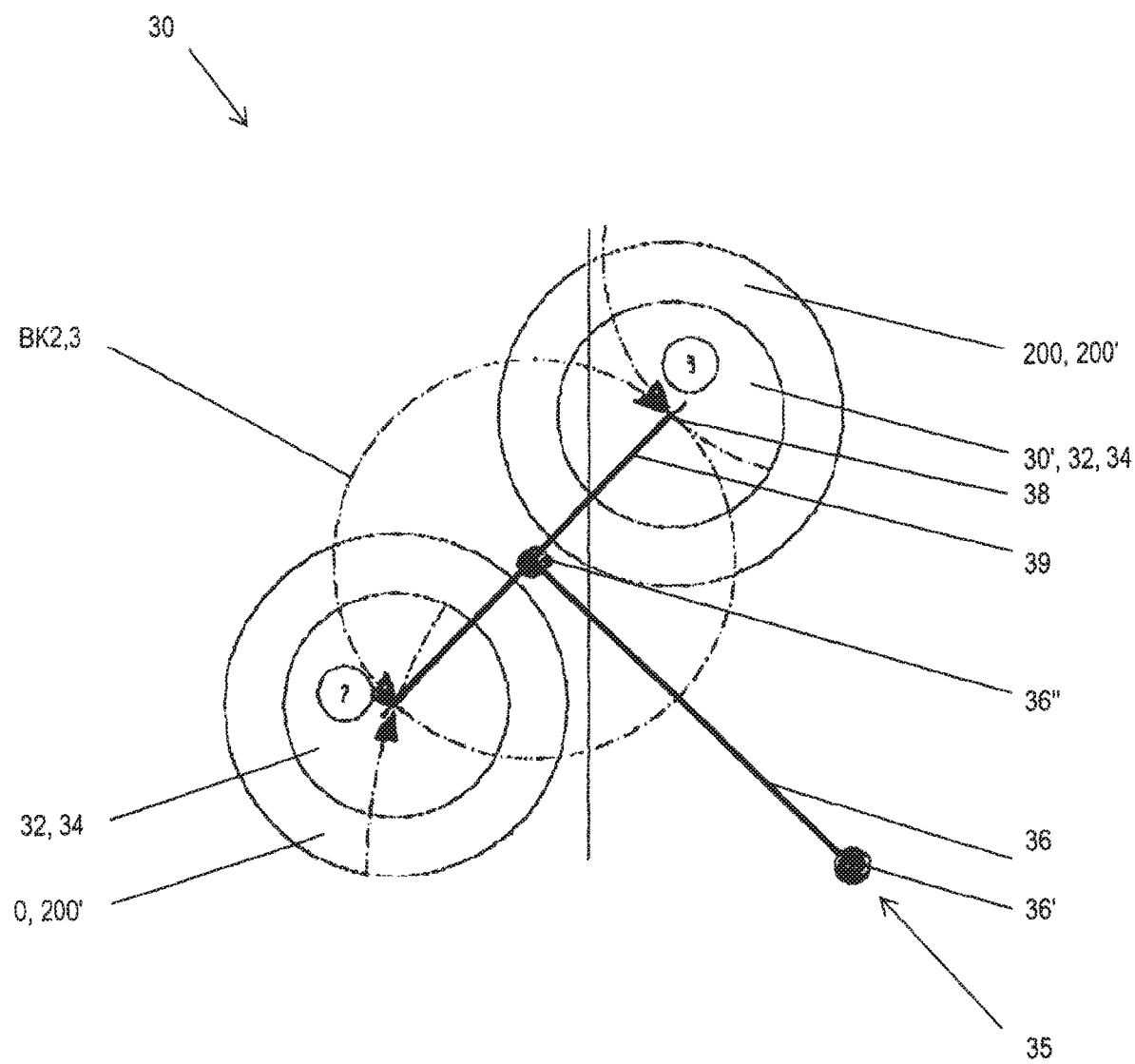
FIG. 1 is a schematic plan view of the handling device (30)

FIG. 1 is the schematic plan view of the handling device (30) as a highly simplified schematic diagram. The at least one extension arm (36) is coupled by means of a first extension arm pivot location (36') to a receiving member (35) or is supported at that location. The receiving member (35) can be constructed as a base (35') and can have a preferably linear degree of freedom so that different operating planes can be approached. For example, a sliding member (35") may provide the linear degree of freedom—the sliding member (35") and base (35') are not illustrated.

The first extension arm pivot location (36') which is provided at the end side of the extension arm (36) preferably supports a pivot movement about a vertical axis and thus enables the pivoting of the extension arm (36) in a horizontal plane. The pivot movement kinematics centrally relative to the first extension arm pivot location (36') preferably follows a circular shape and can accordingly carry out pivot paths of up to 360 degrees. However, as a result of the spatial relationships adjacent to a tire vulcanization machine (100), the pivot path is often limited to from 90 to 180 degrees.

The second extension arm pivot location (36") which is provided opposite the first extension arm pivot location (36') and preferably also at the end side couples the at least two gripping tools (30') to the extension arm (36) with a first degree of freedom of movement.

The second extension arm pivot location (36") is preferably constructed in a similar manner to the first extension arm pivot location (36') and preferably also supports a pivot movement about a vertical axis so that a pivoting of the at least two gripping tools (30') relative to the extension arm (36) can be carried out in a horizontal plane.

The at least two gripping tools (30') can each be arranged at the end side on a tool arm (39)—in this instance, the tool arm (39) is practically interposed between the gripping tools (30') and the coupling location in the form of the second extension arm pivot location (36"). In the embodiment shown in FIG. 1, the production is carried out in a symmetrical manner, but other asymmetrical situations can also be provided, in particular by selecting the coupling location eccentrically relative to the tool arm (39). The symmetrical embodiment shown is advantageous since without correction pivot movements of the extension arm (36) precisely one operating location (300) can be approached with both gripping tools (30').

The pivot movement kinematics BK2,3 of the at least two gripping tools (30') relative to the extension arm (36) about the second extension arm pivot location (36") is in the form of a circular path and can accordingly produce pivot paths of up to 360 degrees. With the symmetrical construction shown, the circular paths of the gripping tools (30') are both concentric and congruent. In the case of an asymmetrical production, the circular path movements of the gripping tools (30') are also concentric, but the circular path diameters differ according to the center offset of the second extension arm pivot location (36") with respect to the tool arm (39).

The gripping tools (30') are preferably coupled to the tool arm (39) by means of a gripping tool receiving member (38) in each case. There may be provision for the gripping tool receiving members (38) to support a degree of freedom of movement. Preferably, this degree of freedom of movement is in terms of construction and spatial orientation identical to that of the second extension arm pivot location (36").

The gripping tools (30') may be structurally identical and constructed in such a manner that handling and gripping tasks can be carried out both for tire blanks (200') and for completed tires (200).

A variant of the handling device (30) according to the invention makes provision for the gripping tools (30') to be adapted to the handling tasks for tire blanks (200') and completed tires (200) since the mechanical properties and the sensitivity of tire blanks (200') and completed tires (200) differs considerably.

From a point of view of the tire vulcanization machine (100) with the core element thereof formed from the handling space (110), it is loaded with tire blanks (200') and, after the tire vulcanization, completed tires (200) are unloaded. According to this nomenclature, loader gripping tools (34) and unloading gripping tools (32) are referred to.

Figure 2:
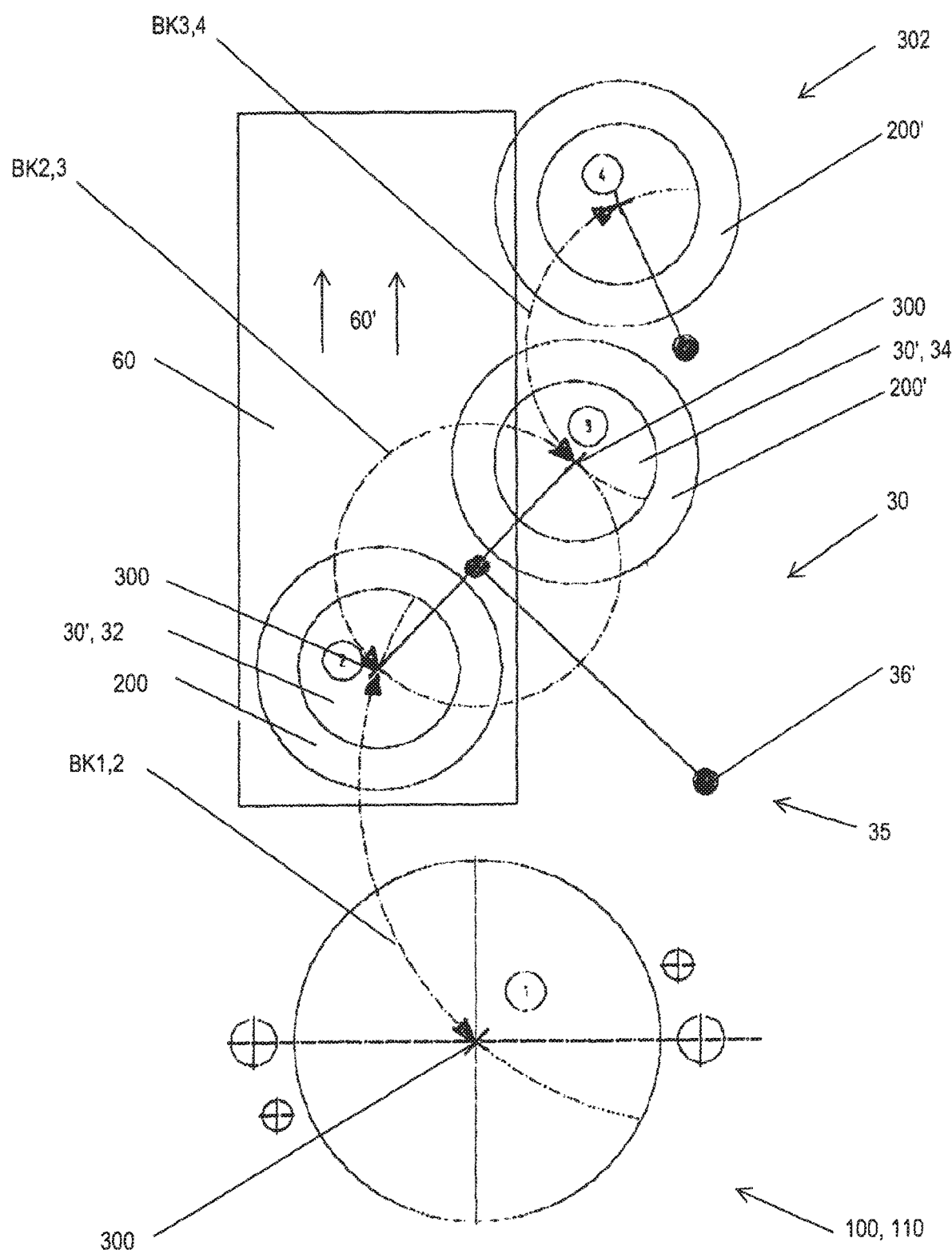
FIG. 2 is a plan view of a schematically illustrated region of a tire production installation with a tire vulcanization machine (100), a handling device (30) and a transport device (60)

FIG. 2 includes the plan view of a schematically illustrated region of a tire production installation with a tire vulcanization machine (100), a handling device (30) and a transport device (60) in the form of a schematic diagram.

The handling device (30) is arranged relative to the tire vulcanization machine (100) in a spatial direction and is in this manner capable of providing all the handling functions in the form of loading and unloading from a direction of the tire vulcanization machine (100).

The handling device (30) which is arranged at the rear side of the tire vulcanization machine (100) is particularly preferred so that the accessibility of the front side is supported in an unlimited manner. An additional or alternative advantage of this relative arrangement of the tire vulcanization machine (100) and handling device (30) relative to each other and/or the integration of all the handling functions in a handling device (30) is also that only one handling space is required. Since handling spaces have in most cases to be secured with person protection measures, the invention reduces this complexity. In the embodiment shown in FIG. 2, this complexity is consequently at least halved.

In order to be able to approach the different operating locations (300) of the handling space (110) of the tire vulcanization machine (100), the transport device (60) and the blank stand or magazine (302), the extension arm (36) pivots about the first extension arm pivot location (36') and/or the tool arm (39) pivots about the second extension arm pivot location (36") so that the respective gripping tools (30') can be positioned in the required positions or operating locations (300). The pivot movements about the two extension arm pivot locations (36', 36") may be carried out sequentially and/or at least partially in parallel.

The sequence of the handling functions for loading and unloading and incoming transport and outgoing transport are carried out operationally as follows.

From the additional piece of handling equipment (not illustrated), a tire blank (200') is placed in the blank stand (302) in position 4. The blank stand (302) pivots the tire blank (200') from position 4 to position 3 by carrying out a supply movement BK3,4. The position 3 is the operating location (300) which can be approached by both the blank stand (302) and the handling device (30).

The handling device (30) preferably pivots in a room plane level which differs from position 3 and/or position 4 in such a manner that a gripping tool (30', 34') is displaced into a congruent parallel plane of the operating location (300) of position 3. If this positioning is concluded, the handling device (30) preferably moves by means of linear movement into the spatial plane level of position 4. The linear movement is enabled by means of the degree of freedom of the receiving member (35) which is constructed as a base (35') with a sliding member (35"). The sliding member (35") and base (35') are also not illustrated in FIG. 2.

The gripping tool (30', 34) grips in the operating location (300) of position 3 the tire blank (200') offered by the blank stand (302). Subsequently, the blank stand (302) which is then empty pivots from position 3 back to position 4 along the supply movement BK3,4. The blank stand (302) after reaching position 4 is ready to be loaded again with a tire blank (200') by the additional piece of handling equipment.

In the next handling step, the handling device (30) moves with the gripped tire blank (200') from the spatial plane level of position 4 into the spatial plane level of position 1. The approach location (300) in Position 1 corresponds to the operating plane of the handling space (110) of the tire vulcanization machine (100).

If the tire vulcanization machine (100) is located in a handling state as a result of the fact that the handling space (110) is open, the handling device (30) pivots to the spatial height level of the operating plane (300) of the handling space (110) with the gripping tool (30', 32') from position 2 into position 1. The pivot movement is preferably a circular kinematics along the path BK1,2.

In position 1, the gripping tool (30, 32) grips the completed tire (200) which has residual heat and subsequently pivots from position 1 into position 2. If position 2 is reached, the completed tire (200) is placed on a transport device (60) which is provided for transporting the tire (200) away in a transport movement direction (60').

After the completed tire (200) has been placed on the transport device (60) and the situation-related state of the handling device (30) as illustrated in FIG. 2, the gripping tool (30', 34) is moved with the gripped tire blank (200') along the pivot path BK2,3 from position 3 to position 2. The movement kinematics BK2,3 is in this Instance circular and has a pivot path which substantially corresponds to a radian measure amount of 180 degrees.

The gripping tool (30', 34) with the gripped tire blank (200') is pivoted from position 2 along the pivot path BK1,2 to position 1 and therefore into the operating location (300) of the processing space (110) of the tire vulcanization machine (100). The gripping tool (30', 34) subsequently places the tire blank (200') in Position 1 and subsequently pivots along the pivot path BK1,2 from position 1 into position 2.

The subsequent last handling step of a complete loading and unloading cycle is the production of the circular pivot path BK2,3 in the context of the radian measure value PI so that the location and position arrangement shown in FIG. 2 is present, but with empty gripping tools (30', 32, 34) without tires (200, 200').

Figure 3:
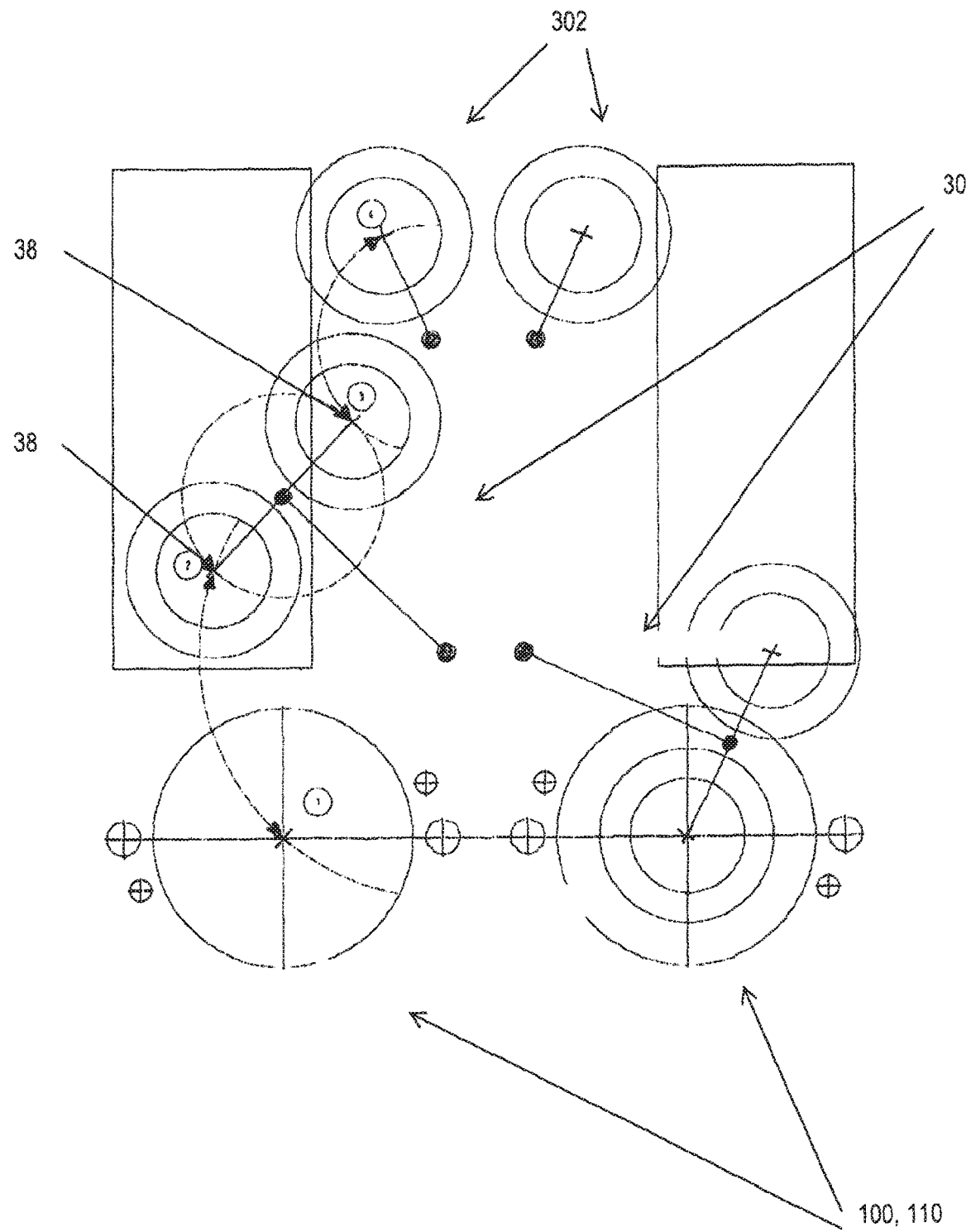
FIG. 3 is the plan view of a schematically illustrated region of a tire production installation with two tire vulcanization machines (100), two handling devices (30) and two transport devices (60).

FIG. 3 explains with reference to a schematic plan view comprising a schematically illustrated region of a tire production installation with two tire vulcanization machines (100), two handling devices (30) and two transport devices (60) additional possibilities for use and embodiments of the invention.

FIG. 3 practically shows the duplicated situation according to FIG. 2, that is to say, in each case a handling device (30) for all the required loading and unloading handling functions is associated with a tire vulcanization machine (100) and carries out the handling functions from one side, preferably the rear side of the tire vulcanization machine (100).

However, the invention also recognizes that, under suitable conditions, a handling device (30) which is preferably arranged centrally and symmetrically relative to the tire vulcanization machines (100) can combine all the mentioned handling functions for both tire vulcanization machines (100).

The conditions are present when
  the tire vulcanization cycle time within the tire vulcanization machines (100) is both identical and temporally offset with respect to each other, and
  the handling time requirement for a complete handling cycle is at least not substantially above the tire vulcanization time of the tire vulcanization machines (100).

If a handling device (30) with two gripping tools (30', 32, 34) is used, there is further a requirement that
  in both tire vulcanization machines (100) tire dimensions which can be gripped with the gripping tools (30', 32, 34) are processed.

In the case of a handling device (30) for two tire hot presses (100), the invention provides for a pivot capacity of the at least one extension arm (36) about the first extension arm pivot location (36') of preferably 1¾ of 180 degrees.

If considerably different tire dimensions are intended to be processed in the two tire vulcanization machines, the invention makes provision for a handling device (30) for all the handling tasks of both tire vulcanization machines (100) via four gripping tools (30', 32 34) with gripping jaw widths which are adapted in pairs to the different tire dimensions.

In order to position the respective gripping tools (30', 32, 34) for different tire dimensions, there is introduced according to the invention in the gripping tool receiving members (38) by means of a rotary articulation another rotary degree of freedom which pivots the gripping tools (30', 32, 34) which are arranged in a sandwich-like manner and consequently in pairs between the handling cycles for each tire vulcanization machine (100) in the operating plane thereof.

The invention claimed is:

1. A handling device for tires, comprising: a receiving member; at least one extension arm secured with a first extension arm pivot location to the receiving member so that the at least one extension arm is pivotable relative to the receiving member; a first gripping tool, the at least one extension arm having a second extension arm pivot location so that the first gripping tool is coupled to the at least one extension arm; and at least one second gripping tool coupled to the second extension arm pivot location, wherein the at least two gripping tools are pivotable relative to at least one of the extension arm pivot locations, wherein the gripping tools are coupled to the extension arm so as to be pivotable along a movement kinematics BK2,3 of at least one of the gripping tools, wherein the movement kinematics of the at least two gripping tools are concentric relative to each other or congruent.

2. A handling device for tires, comprising: a receiving member; at least one extension arm secured with a first extension arm pivot location to the receiving member so that the at least one extension arm is pivotable relative to the receiving member; a first gripping tool, the at least one extension arm having a second extension arm pivot location so that the first gripping tool is coupled to the at least one extension arm; and at least one second gripping tool coupled to the second extension arm pivot location, wherein the at least two gripping tools are pivotable relative to at least one of the extension arm pivot locations, wherein each of the at least two gripping tools is coupled by a respective gripping tool receiving member, wherein the handling device has at least one linear degree of freedom which is non-parallel with respect to a pivot plane so that the gripping tools are movable in different spatial height levels.

3. The handling device for tires according to claim 2, wherein the at least one linear degree of freedom is supported by the receiving member and/or the extension arm pivot location and/or the gripping tool receiving member and/or at least one of the gripping tools.

4. A handling device for tires, comprising: a receiving member; at least one extension arm secured with a first extension arm pivot location to the receiving member so that the at least one extension arm is pivotable relative to the receiving member; a first gripping tool, the at least one extension arm having a second extension arm pivot location so that the first gripping tool is coupled to the at least one extension arm; and at least one second gripping tool coupled to the second extension arm pivot location, wherein the at least two gripping tools are pivotable relative to at least one of the extension arm pivot locations, wherein the extension arm has a length dimensioning and/or a pivot path capacity to provide a handling space which comprises operating locations in a tire vulcanization machine and a transport device and a blank stand.

5. A method for carrying out a loading and unloading cycle of a tire vulcanization machine with tires with a handling device according to claim 1, comprising the steps of:
    i. positioning a first gripping tool in a position 3;
    ii. gripping a previously prepared tire blank with the gripping tool positioned in position 3;
    iii. pivoting the handling device about the first extension arm pivot location so that a second gripping tool is pivoted from a position 2 to a position 1;
    iv. gripping the completed tire with the second gripping tool in a handling space of the tire vulcanization machine;
    v. pivoting the handling device about the first extension arm pivot location so that the second gripping tool with the gripped completed tire is pivoted from position 1 to position 2;
    vi. placing the completed tire on a transport device;
    vii. pivoting at least one of the gripping tools about the second extension arm pivot location between position 2 and position 3 so that the gripped tire blank is positioned in position 2,
    viii. pivoting the handling device about the first extension arm pivot location so that the first gripping tool with the gripped tire blank is pivoted from position 2 to position 1;
    ix. placing the tire blank in the handling space of the tire vulcanization machine; and
    x. pivoting the handling device about the first extension arm pivot location so that the first gripping tool is pivoted from position 1 to position 2.

6. The method for carrying out a loading and unloading cycle of a tire vulcanization machine with tires according to claim 5, further comprising the step of:
    xi. pivoting at least one of the gripping tools about the second extension arm pivot location between position 2 and position 3 so that the gripped tire blank is positioned in position 2.

7. The method for carrying out a loading and unloading cycle of a tire vulcanization machine with tires according to claim 5, wherein the steps i. and/or iii. and/or v. and/or vii. and/or viii. and/or x. are carried out within a spatial height level different from a spatial height level of the steps ii. and/or iv. and/or vi. and/or ix.

8. The method for carrying out a loading and unloading cycle of a tire vulcanization machine with tires according to claim 5, wherein the step iii. and/or v. and/or viii. and/or x. is carried out along movement kinematics (BK1,2).

9. The method for carrying out a loading and unloading cycle of a tire vulcanization machine with tires according to claim 5, wherein the step vii. and/or xi. is carried out along movement kinematics (BK2,3).

10. A production installation for producing tires, comprising: at least one tire vulcanization machine; at least one transport device; at least one blank stand; and at least one handling device according to claim 1.

* * * * *